(12) United States Patent
Ota et al.

(10) Patent No.: US 7,701,522 B2
(45) Date of Patent: Apr. 20, 2010

(54) ACTIVE MATRIX LIQUID CRYSTAL DISPLAY DEVICE

(75) Inventors: Akio Ota, Tottori (JP); Satoshi Morita, Tottori (JP); Makoto Murakami, Tottori (JP); Osamu Kobayashi, Tottori (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 193 days.

(21) Appl. No.: 11/374,137

(22) Filed: Mar. 14, 2006

(65) Prior Publication Data

US 2006/0221288 A1 Oct. 5, 2006

(30) Foreign Application Priority Data

Mar. 30, 2005 (JP) .............................. 2005-097204

(51) Int. Cl.
*G02F 1/1333* (2006.01)
*G02F 1/136* (2006.01)
*G02F 1/1343* (2006.01)
*G02F 1/13* (2006.01)

(52) U.S. Cl. ............................. 349/40; 349/42; 349/54; 349/55; 349/139; 349/141; 349/143; 349/192

(58) Field of Classification Search .................. 349/42, 349/43, 54, 139, 141, 143, 149, 151, 152, 349/40, 55, 192

See application file for complete search history.

(56) References Cited

U.S. PATENT DOCUMENTS 5,838,411 A * 11/1998 Hayakawa et al. .......... 349/139
6,618,112 B1 * 9/2003 Yoshimura et al. .......... 349/155
6,639,644 B1 * 10/2003 Tateno et al. ................ 349/155
6,961,112 B2 * 11/2005 Yoshimura et al. .......... 349/187

FOREIGN PATENT DOCUMENTS

| JP | 08-194235 A | 7/1996 |
| JP | 10-213816 | 8/1998 |
| JP | 11-52427 | 2/1999 |
| JP | 2001-021912 A | 1/2001 |

* cited by examiner

*Primary Examiner*—Charlie Peng
*Assistant Examiner*—Hung Lam
(74) *Attorney, Agent, or Firm*—Westerman, Hattori, Daniels & Adrian, LLP (57) ABSTRACT

An active matrix liquid crystal display device 10 of the present invention includes: a plurality of signal lines Y1, ... Ym and scanning lines X1, ... Xn, Xn+1, Xn+2 which are arranged in a matrix state on a substrate; switching transistors 14 arranged near the intersection of each of the signal lines and the scanning lines; and pixel electrodes that are severally arranged in positions surrounded by the signal lines and the scanning lines and connected to the switching transistors, in which the pixel electrode is made up of a pixel electrode for display 12(25) that contributes to display, which is provided in an effective display region, and a dummy pixel electrode 27 that does not contribute to display, which is provided in a non-effective display region, and the dummy pixel electrode has a smaller area than the area of the pixel electrode for display and a plurality of the dummy pixel electrodes are parallelly provided for each signal line. Consequently, it is possible to provide an active matrix liquid crystal display device in which a large number of dummy pixel electrodes are provided without increasing the area of the non-effective display region and which is capable of dealing with multiple entries of static electricity from terminals.

4 Claims, 8 Drawing Sheets

ACTIVE MATRIX LIQUID CRYSTAL DISPLAY DEVICE

BACKGROUND OF THE INVENTION

1. Field of the Invention

The present invention relates to an active matrix liquid crystal display device, more particularly to an active matrix liquid crystal display device provided with preventing means for thin film transistor (hereinafter, referred to as "TFT") destruction caused by static electricity, which uses TFTs as a semiconductor switching element.

2. Description of the Related Art

Liquid crystal display devices generally have characteristics of slim, lightweight and low power consumption, and active matrix liquid crystal display devices of thin film transistor method are widely used in areas from mobile terminals to large-sized television sets.

Figure 4:
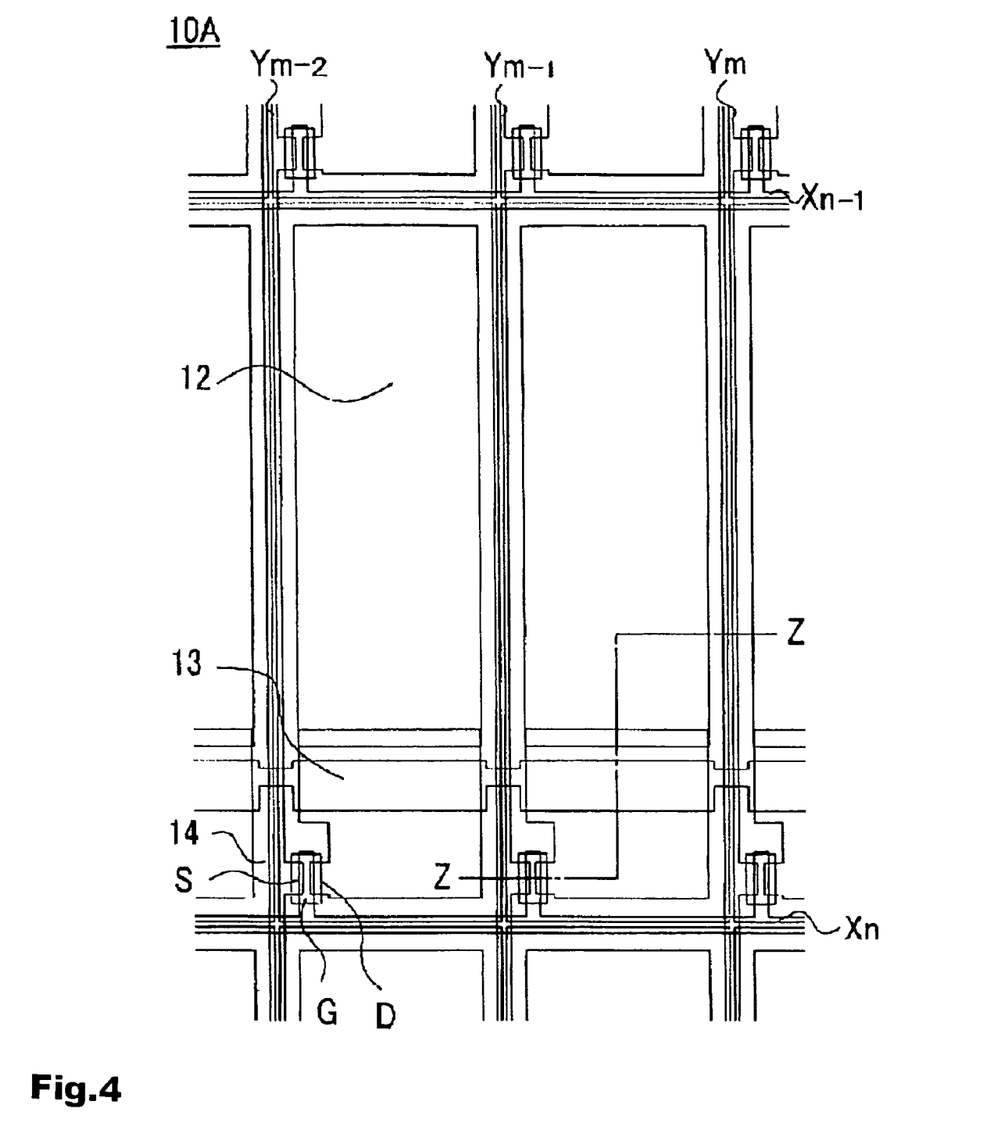
FIG. 4 is a plan view showing a constitution of an area for several pixels of a conventional active matrix liquid crystal display device.
Figure 5:
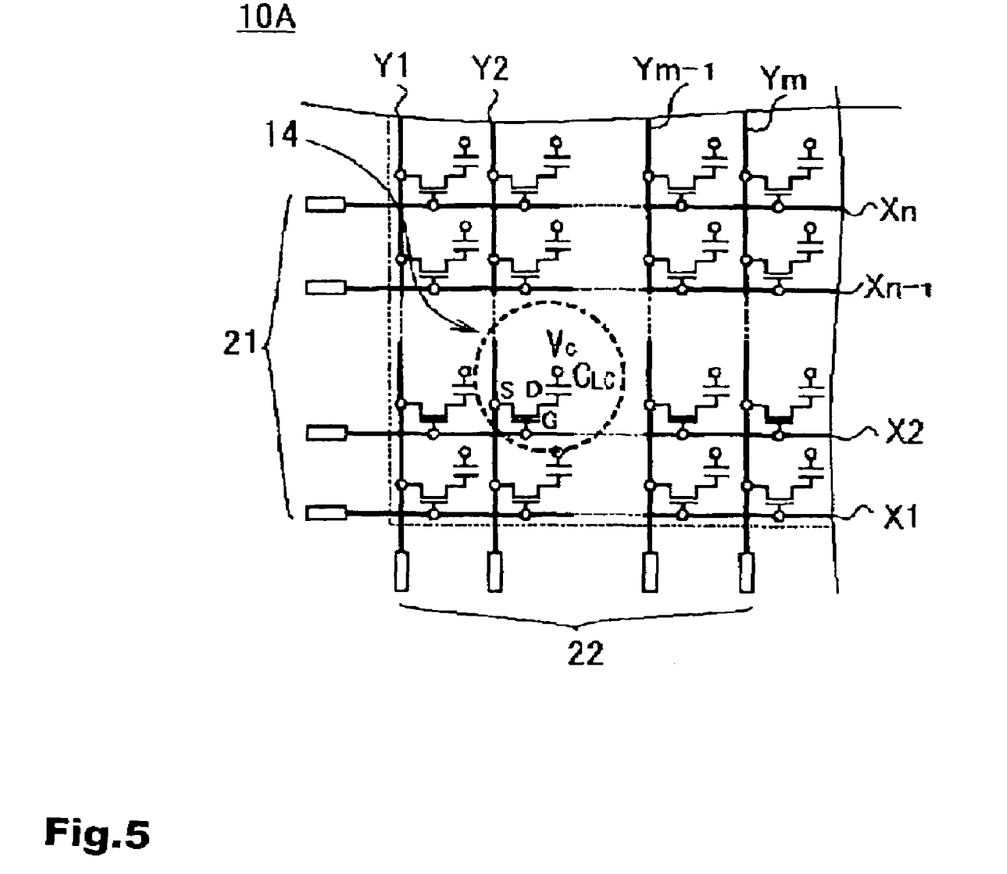
FIG. 5 is a schematic equivalent circuit diagram for several pixels of the conventional active matrix liquid crystal display device.
Figure 6:
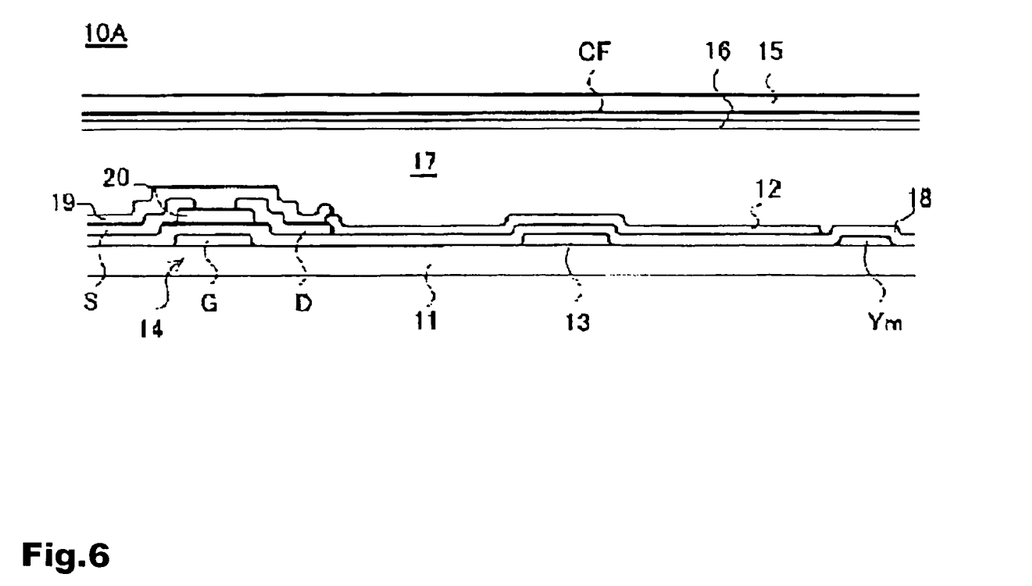
FIG. 6 is a cross-sectional view taken along VI-VI line of FIG. 4.

First, description will be made for a general constitution of a conventional active matrix liquid crystal display device by referring to FIG. 4 that is a plan view of an area for several pixels, FIG. 5 that is a schematic equivalent circuit diagram for the several pixels, and FIG. 6 that is a cross-sectional view taken along VI-VI line of FIG. 4. In a conventional liquid crystal display device 10A, pixel electrodes 12 are provided for each region surrounded by scanning lines X1, X2, ... Xn and signal lines Y1, Y2, ... Ym, which are provided in a matrix state on a first translucent substrate 11, and the pixel electrode 12 is shown by a liquid crystal capacitance $C_{LC}$ in an equivalent manner in FIG. 5. Generally, an auxiliary capacitance Cs formed by an auxiliary capacitance electrode 13 is parallelly connected to the liquid crystal capacitance $C_{LC}$. One end of the liquid crystal capacitance $C_{LC}$ is connected to a switching transistor 14 for driving, and the other end is connected to a common electrode 16, which is provided on a second translucent substrate 15 via a color filter layer CF, and predetermined common potential Vc is applied to the other end.

The switching transistor 14 consists of an insulated-gate field-effect thin film transistor (TFT), its source electrode S is connected to the signal lines Y1, Y2, ... Ym and supplied with image signal Vs, and a drain electrode D is connected to one end of the liquid crystal capacitance $C_{LC}$, that is, the pixel electrode 12. Further, the gate electrode G of the switching transistor 14 is connected to the scanning lines X1, X2, ... Xn and gate pulse Vg having predetermined voltage is applied to the gate electrode.

Further, orientation films (not shown) are severally provided on the surface of the pixel electrode 12 and the common electrode 16, and liquid crystal 17 is filled between the first translucent substrate 11 and the second translucent substrate 15. Note that reference numerals 18 and 19 denote insulating films that are made of $SiO_2$ or SiN respectively, and reference numeral 20 denotes an a-Si layer. Then, a plurality of the scanning lines X1, X2, ... Xn and the signal lines Y1, Y2, ... Ym are extracted in two directions or one direction of the frame portion of substrate (peripheral portion of substrate), and scanning line input terminals 21 and signal line input terminals 22 are provided at their terminal portions respectively.

The active matrix liquid crystal display device of such constitution has been recently manufactured in various sizes from a small size for cell phones to a large size having diagonal 40 inches (about 102 cm) to 50 inches (about 127 cm). However, if static electricity enters the display region of the liquid crystal display device in a manufacturing process, display defect occurs at the point where the liquid crystal display device is completed. Particularly, electrostatic defect occurs more easily than before with the advance for higher definition in middle and small display device models. Static electricity occurs only by allowing the device to contact other objects both in the manufacturing process and in transporting panels. Further, static electricity occurs most easily by friction during the rubbing of the orientation films. Therefore, it is imperative that the display defect caused by static electricity be eliminated in the manufacturing technology field of liquid crystal display devices.

Figure 7:
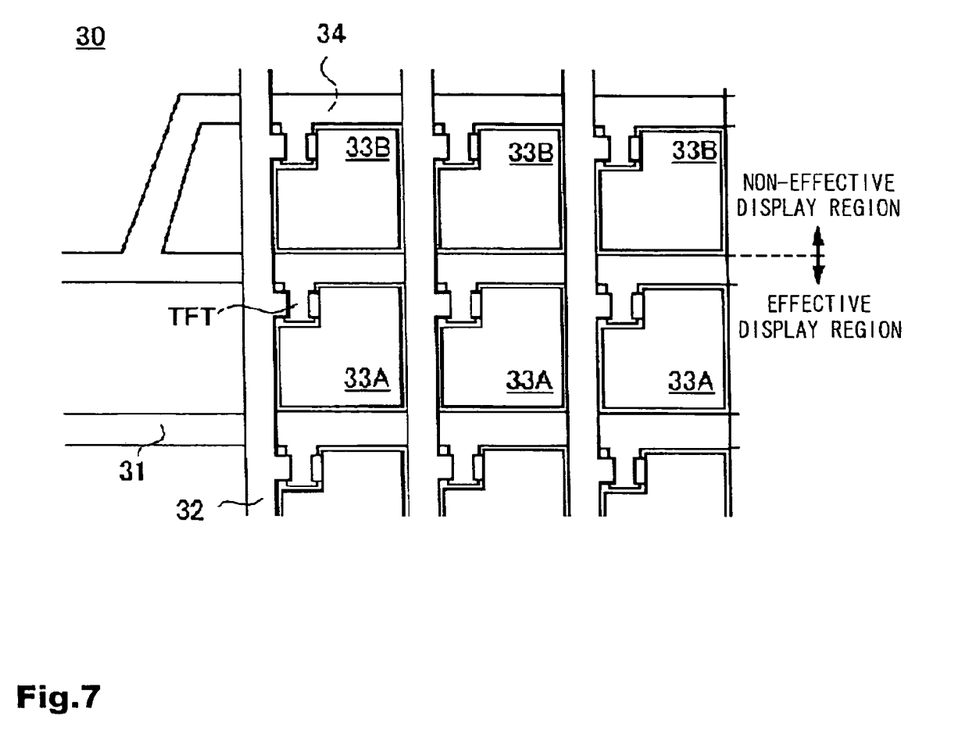
FIG. 7 is a plan view for several pixels of a conventional active matrix liquid crystal display device having dummy pixel electrodes.

Several technologies for preventing the occurrence of pixel defect caused by static electricity are known. For example, the invention of an active matrix liquid crystal display device 30, which is disclosed in Japanese Patent Laid-Open No. 10-213816 publication (claims, paragraphs [0029] to [0034], [0039], [0048], FIG. 2), has: stripe-shaped gate signal lines 31; stripe-shaped source signal lines 32 that are orthogonal to the gate signal lines; switching elements TFT provided near the crossing portions of the lines; and a plurality of pixel electrodes that are connected to the switching elements TFT and formed in a matrix state, on a substrate, and the pixel electrode is made up of a pixel electrode for display 33A that is provided in an effective display region and contributes to display and a dummy pixel electrode 33B that is provided in a non-effective display region and does not contribute to display, and a gate signal line 34 for driving the dummy pixel electrode 33B is formed by branching from the gate signal line 31 of the effective display region, as shown in FIG. 7. Furthermore, the above Japanese Patent Laid-Open No. 10-213816 also suggests that the dummy pixel electrodes 33B be provided in plural rows in order to protect the effective display regions without fail.

Specifically, the liquid crystal display device 30 is capable of protecting the switching elements connected to the pixel electrodes for display in the effective display region because switching elements that are connected to the dummy pixel electrodes 33B provided in the non-effective display region are preferentially destroyed when static electricity enters the liquid crystal display device via the first or the second signal lines 31, 32 during the manufacturing process of the device.

Figure 8:
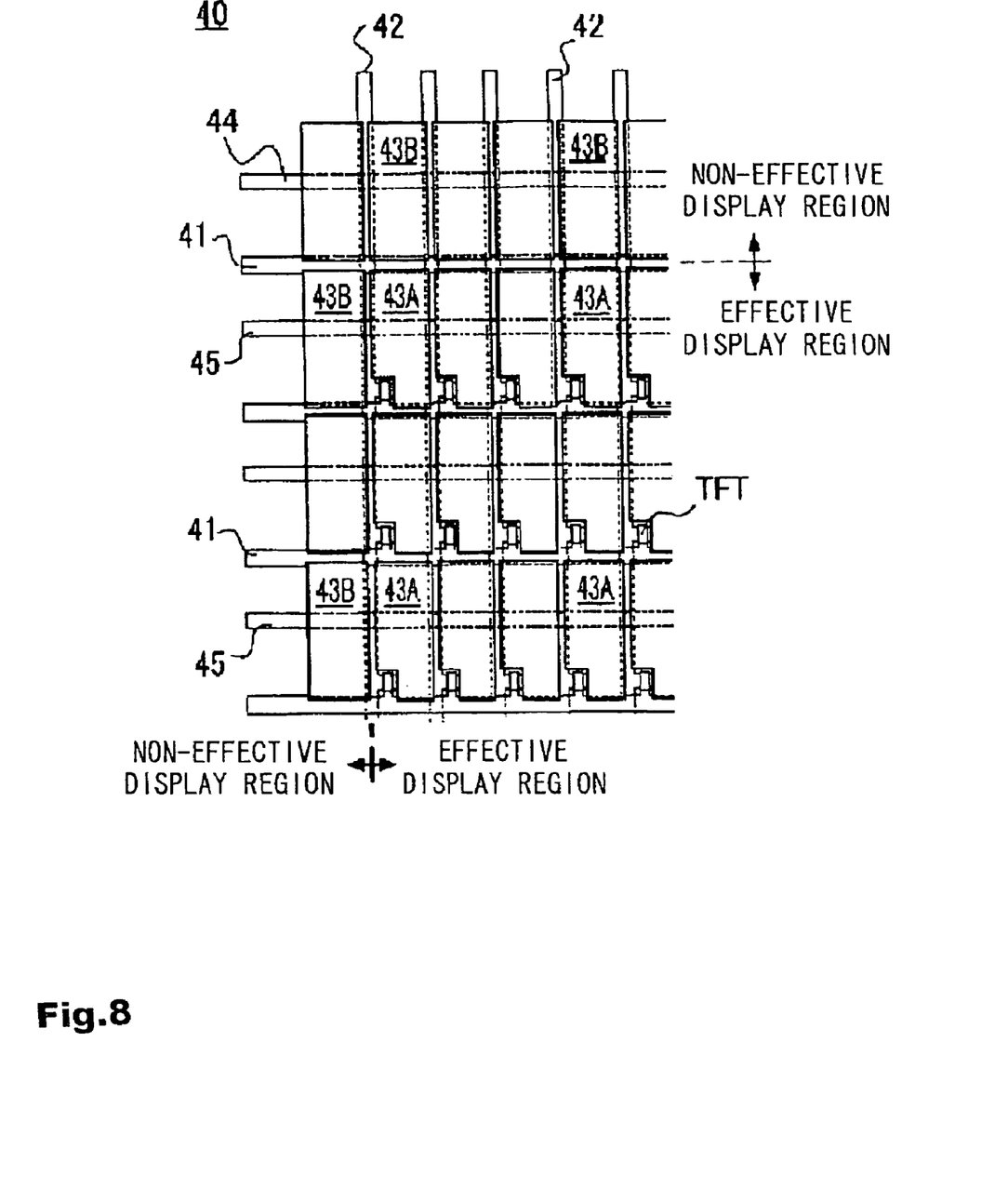
FIG. 8 is a plan view for several pixels of another conventional active matrix liquid crystal display device having dummy pixel electrodes.

On the other hand, in a liquid crystal display device 40 disclosed in Japanese Patent Laid-Open No. 11-052427 publication (claims, FIG. 1), as shown in FIG. 8, scanning lines 41 and signal lines 42 which are formed so as to be orthogonal to each other, switching elements TFT formed on the crossing portions of the scanning lines 41 and the signal lines 42, and pixel electrodes for display 43A, which are connected to the switching elements TFT and driven controlled by signals supplied from the scanning lines 41 and the signal lines 42, are formed in plural numbers in the effective display region, while dummy pixel electrodes 43B separated from the scanning lines 41 and the signal lines 42 are formed in plural numbers on the peripheral portion of the effective display region, and additional auxiliary capacitance electrodes 44 are formed so as to face the dummy pixel electrodes 43B.

Specifically, in the liquid crystal display device 40, the static electricity is charged in the dummy pixel electrodes 43B provided in the non-effective display region when it enters the liquid crystal display device via the first or the second signal lines 41, 42 during the manufacturing process of the device, the charged static electricity is discharged via the additional auxiliary capacitance electrodes 44 or other auxiliary capacitance electrodes 45, and thus it is possible to protect switching elements TFT connected to the pixel electrodes for display 43A in the effective display region.

However, only one dummy pixel electrode 33B is provided for the gate signal line 31 or the source signal line 32 in the liquid crystal display device 30 disclosed in the above-described Japanese Patent Laid-Open No. 10-213816, so that once the switching element TFT of the dummy pixel electrode 33B is destroyed by static electricity, the dummy pixel electrode 33B loses its capability. Consequently, there is a danger that the switching elements TFT of the pixel electrodes 33A in the display region will be destroyed when static electricity enters the device again. In other words, since static electricity occurs only by contacting other objects not only during the rubbing of orientation films but also during the transportation of panels when manufacturing the liquid crystal display device, static electricity could enter the device many times until a finished product is obtained, and there is a possibility that the liquid crystal display device 30 disclosed in the above-described Japanese Patent Laid-Open No. 10-213816 cannot deal with such multiple entries of static electricity.

Note that the above-described Japanese Patent Laid-Open No. 10-213816 also suggests providing the dummy pixel electrodes 33B in plural rows in order to protect the effective display region without fail (refer to paragraph [0039]). In this case, since the dummy pixel electrodes 33B are formed in the same size as or larger than the pixel electrodes 33A of the effective display region (refer to claim 3, paragraph [0048]), there exists a problem that the non-effective display region becomes large.

Furthermore, in the liquid crystal display device 40 disclosed in the above-described Japanese Patent Laid-Open No. 11-052427, static electricity is charged in the dummy pixel electrodes 43B provided in the non-effective display region when it enters the liquid crystal display device via the scanning lines 41 or the signal lines 42 during the manufacturing process of the device. Since the dummy pixel electrodes 43B are separated from the scanning lines 41 and the signal lines 42 to function as a capacitor, there is a possibility that the static electricity will enter the pixel electrodes 43A of the effective display region before it is discharged via the additional auxiliary capacitance electrodes 44 or the other auxiliary capacitance electrodes 45, and the switching elements TFT connected to the pixel electrodes 43A in the effective display region will suffer from electrostatic destruction.

The present inventors, as a result of various kinds of study to solve the problems in the technology of preventing electrostatic destruction of the switching elements that are connected to the pixel electrodes of the effective display region as shown in the above-described conventional example, have found out the following and completed the present invention. To effectively discharge static electricity entered from outside, when only a constitution same as the switching elements TFT connected to the pixel electrodes of the effective display region is provided as the dummy pixels to be provided in the non-effective display region, electrostatic destruction occurs preferentially in the switching elements of the dummy pixels even if the area of the dummy pixel electrode is very small and there is no danger that static electricity will enter the effective display region, and the switching elements connected to the pixel electrodes can be effectively protected. Additionally, since the number of dummy pixels about ten times the conventional pixel electrodes of the effective display region can be provided in the same area, they can deal with multiple entries of static electricity without increasing the area of the non-effective display region.

SUMMARY OF THE INVENTION

Consequently, it is an object of the present invention to provide a liquid crystal display device in which a large number of dummy pixel electrodes are provided without increasing the area of the non-effective display region and which is capable of dealing with multiple entries of static electricity from terminals.

The above-described object of the present invention can be achieved by the following constitution. Specifically, the active matrix liquid crystal display device according to the first aspect of the present invention includes: a plurality of signal lines and scanning lines which are arranged in a matrix state on a substrate; switching transistors arranged near the intersection of each of the signal lines and the scanning lines; and pixel electrodes that are severally arranged in positions surrounded by each of the signal lines and the scanning lines and connected to the switching transistors, in which the pixel electrode is made up of a pixel electrode for display that contributes to display, which is provided in an effective display region, and a dummy pixel electrode that does not contribute to display, which is provided in a non-effective display region, and the dummy pixel electrode has a smaller area than the area of the pixel electrode for display and a plurality of the dummy pixel electrodes are parallelly provided for each signal line.

Further, in the active matrix liquid crystal display device of the first aspect, it is preferable that the area of the dummy pixel electrode be ½ or smaller and 1/20 or larger than the area of the pixel electrode for display.

Further, in the active matrix liquid crystal display device of the first aspect, it is preferable that the source electrodes and the gate electrodes of switching transistors connected to the dummy pixel electrodes be parallelly connected to the signal lines and parallelly connected to the scanning lines, respectively.

Further, in the active matrix liquid crystal display device of the first aspect, it is preferable that the channel width and the channel length of the switching transistors connected to the dummy pixel electrodes be narrower and shorter than the channel width and the channel length of switching transistors connected to the pixel electrodes for display.

DESCRIPTION OF THE PREFERRED EMBODIMENTS

Figure 1:
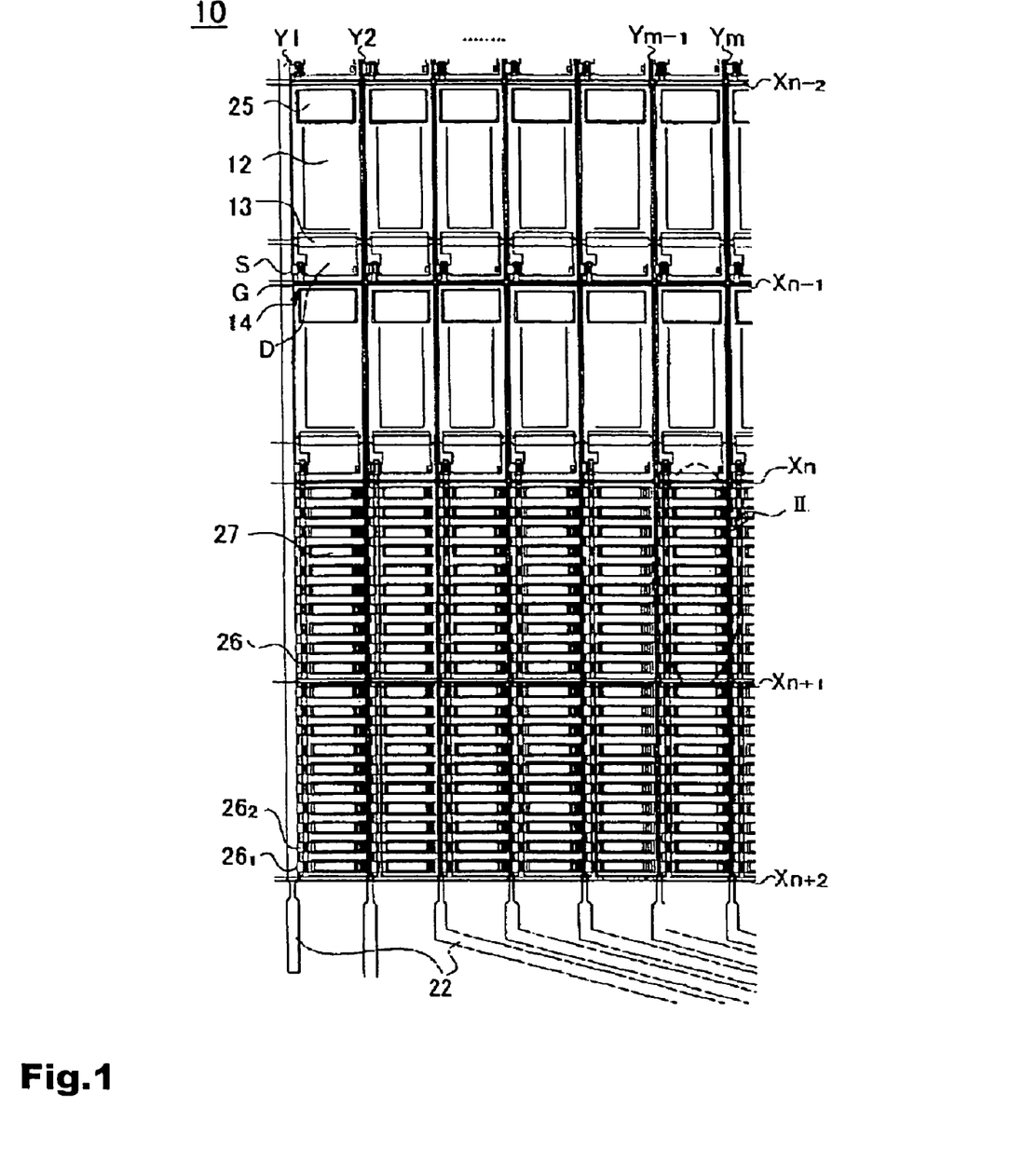
FIG. 1 is an enlarged plan view of an area near an effective display region and a non-effective display region of the semi-transmissive liquid crystal display device according to an embodiment.
Figure 2:
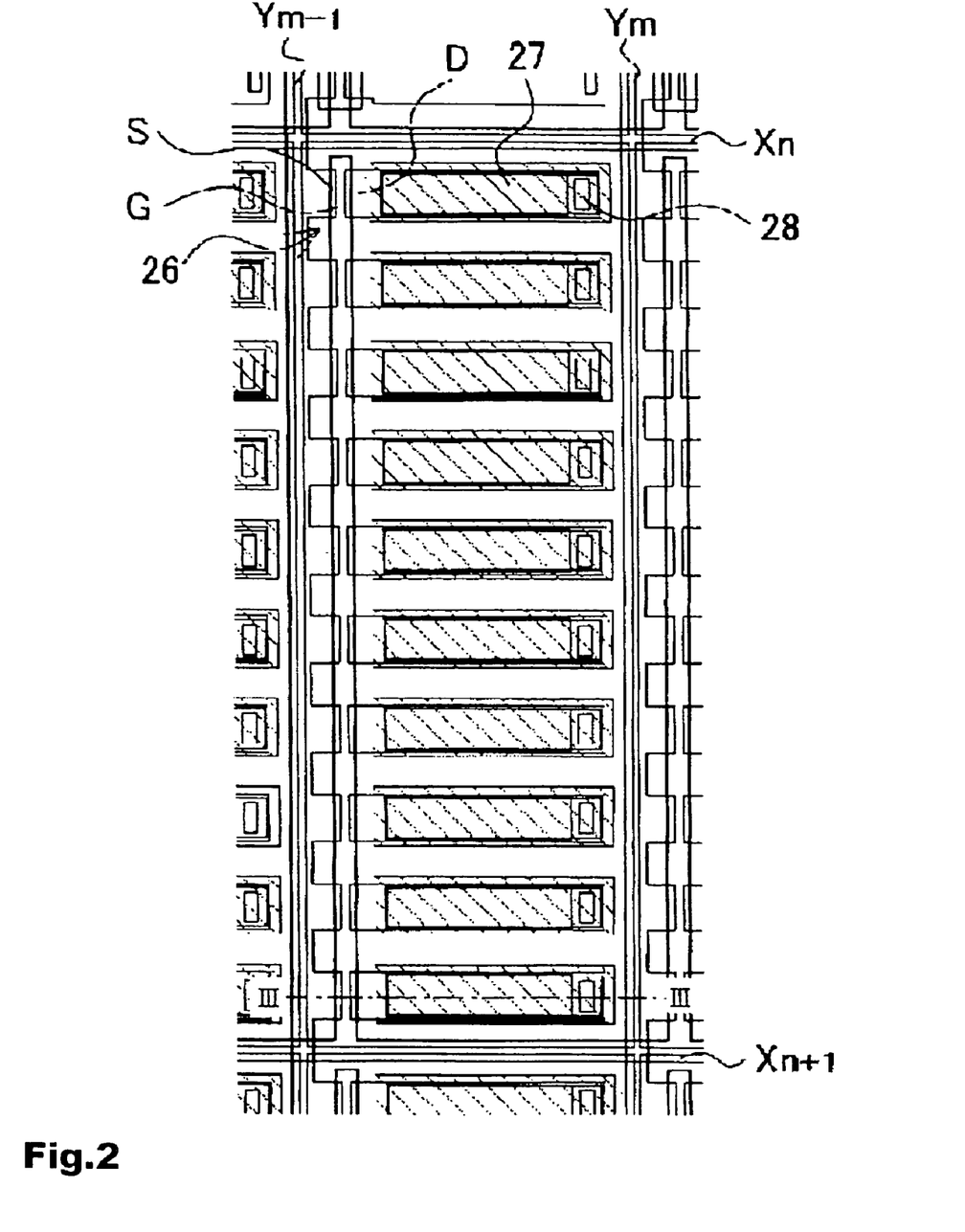
FIG. 2 is an enlarged plan view of region II of FIG. 1.
Figure 3:
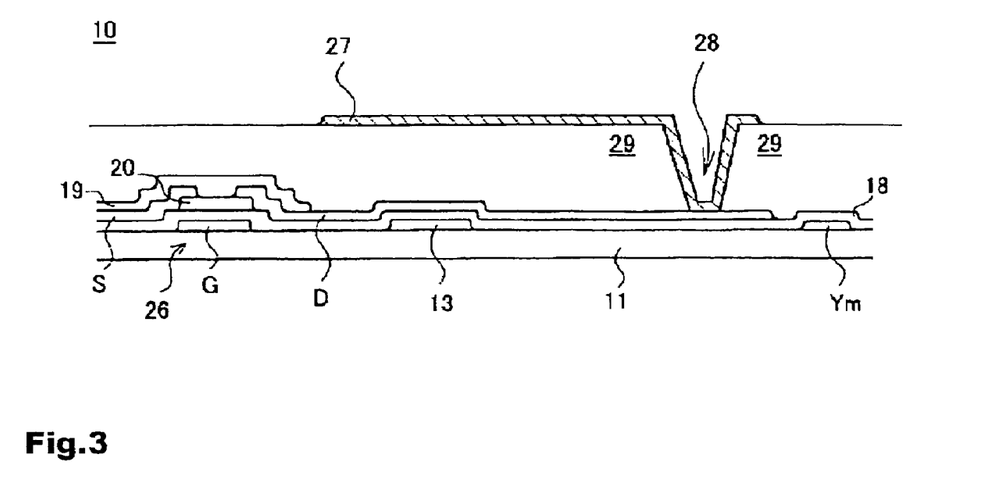
FIG. 3 is a cross-sectional view taken along III-III line of FIG. 2.

In the following, an embodiment of the active matrix liquid crystal display device according to the present invention will be described in details with reference to the drawings. However, the embodiment shown below exemplify a semi-transmissive liquid crystal display device as the active matrix liquid crystal display device for realizing the technical concept of the present invention. The embodiment is not intended to specify the present invention to the semi-transmissive liquid crystal display device, but the present invention are equally applicable for devices to which various modifications are performed without departing from the technical concept shown in the claims. Note that FIG. 1 is an enlarged plan view of an area near an effective display region and a non-effective display region of the semi-transmissive liquid crystal display device according to the embodiment, FIG. 2 is an enlarged plan view of region II of FIG. 1, and FIG. 3 is a cross-sectional view taken along III-III line of FIG. 2. Meanwhile, in FIG. 1 to FIG. 3, the same reference numerals are applied to the same components as the liquid crystal display device of a conventional example shown in FIG. 4 to FIG. 6 and description will be made.

EMBODIMENT

In a semi-transmissive liquid crystal display device 10 according to the example, scanning lines X1, X2, ... Xn, Xn+1, Xn+2 and signal lines Y1, Y2, ... Ym are provided in a matrix state on a first translucent substrate 11. Of these, regions surrounded by the scanning lines X1, X2, ... Xn and the signal lines Y1, Y2, ... Ym are effective display regions, and regions surrounded by the scanning lines Xn, Xn+1, Xn+2 and the signal lines Y1, Y2, ... Ym are non-effective display regions.

In the effective display regions, a pixel electrode, which is made up of a pixel electrode 12 and a reflecting electrode 25, which contribute to display, are provided for each region surrounded by each scanning line and signal line. Further, switching transistors 14 consist of TFT, their source electrodes S are connected to the signal lines Y1, Y2, ... Ym, gate electrodes G are connected to the scanning lines X1, X2, ... Xn, and drain electrodes D are connected to the pixel electrodes 12 and also connected to the reflecting electrodes 25 via contact holes (not shown) at the same time. In addition, auxiliary capacitance electrodes 13 are provided under the drain electrodes D. Since the operating principle of the semi-transmissive liquid crystal display device 10 is already known, its detail explanation will be omitted.

On the other hand, in the semi-transmissive liquid crystal display device 10 according to the embodiment, dummy pixels having switching transistors 26 made of TFT and dummy pixel electrodes 27, which do not contribute to display, are provided in plural numbers for each signal line Y1, Y2, ... Ym in the non-effective display regions surrounded by the scanning lines Xn, Xn+1, Xn+2 and the signal lines Y1, Y2, ... Ym.

In the switching transistors 26 of the dummy pixels, the source electrodes S are parallelly connected to each signal line Y1, Y2, ... Ym, the gate electrodes G are parallelly connected to each scanning line Xn+1, Xn+2, and the drain electrodes D are connected to the dummy pixel electrodes 27 provided on an interlayer film 29 via contact holes 28 as shown in FIG. 3. Then, the channel width and the channel length of the switching transistors 26 of the dummy pixels are narrower and shorter than the channel width and the channel length of the switching transistors 14 connected to the pixel electrodes for display, and thus the switching transistors 26 suffers electrostatic destruction prior to the switching transistors 14 connected to the pixel electrodes for display.

The area of the dummy pixel electrode 27 is smaller than the area of an electrode that contributes to display for one pixel in the effective display region, that is, a combined area of the area of the pixel electrode 12 and the area of the reflecting electrode 25. If the area of the dummy pixel electrode 27 is too wide, the number of dummy pixels parallelly provided cannot be increased unless the non-effective display region is made wider. If the area is too narrow, a static electricity amount that can be flowed to one dummy pixel becomes smaller. Therefore, the area of the dummy pixel electrode 27 should be $1/2$ or smaller and $1/20$ or larger than the area of the pixel electrode for display, which is made up of the pixel electrode 12 and the reflecting electrode 25 in the effective display region. A more preferable area of the dummy pixel electrode 27 is $1/5$ or smaller and $1/15$ or larger than the area of the pixel electrode for display in the effective display region. Meanwhile, in FIG. 1, each area of the dummy pixel electrodes 27 is set to $1/10$ the area of the pixel electrode for display in the effective display region, and the drawing shows 10 each of the electrodes that are severally provided between the scanning lines Xn and Xn+1 and between the scanning lines Xn+1 and Xn+2, which are 20 in total.

In the semi-transmissive liquid crystal display device 10 according to this embodiment, which includes the dummy pixels of this constitution, when static electricity enters from the input terminals for signal lines 22, electrostatic destruction is caused in a switching transistor $26_1$ of a dummy pixel closest to the input terminals for signal lines 22 and static electricity is discharged. Then, when static electricity enters from the input terminals for signal lines 22 again, electrostatic destruction is caused in a switching transistor $26_2$ next to the switching transistor $26_1$ that suffered electrostatic destruction first, and static electricity is discharged. Accordingly, during the manufacturing process of the semi-transmissive liquid crystal display device 10, it is possible to accept up to 20 times of entry of static electricity, which can destroy the switching transistors 14 in the effective display region, and thus the semi-transmissive liquid crystal display device 10 substantially causing no display defect can be obtained.

Meanwhile, although description has been made for the semi-transmissive liquid crystal display device as an example in this embodiment, the present invention is not limited to this, and can be applied for transmissive liquid crystal display devices and reflective liquid crystal display devices as well.

The present invention exerts the excellent effects as described below by including the above-described constitution. Specifically, according to the invention shown by the first aspect of present invention, a plurality of the dummy pixels having very small switching transistors were parallelly provided in the non-effective display region, the switching transistors of the dummy pixels sacrificially spark preferentially even if static electricity enters from the terminals to allow the static electricity to go out, so that there is a small possibility that static electricity will reach the display region, and thus a liquid crystal display device with less display defects can be obtained. Additionally, since a plurality of the dummy pixel electrodes are parallelly provided, they can deal with multiple entries of static electricity, so that there is a very small danger that pixels for display in the display region will cause electrostatic destruction during the manufacturing process.

Further, since one dummy pixel electrode is electrically equivalent to one pixel electrode for display, it is possible to arrange 2 to 15 dummy pixels in the area for one pixel for display from the viewpoint of area when the size of one dummy pixel electrode is set to $1/2$ or smaller and $1/20$ or larger than the pixel electrode for display, so that the non-effective display region (frame portion) does not become wider. Furthermore, since a large number of sacrificial dummy pixels is formed in series from input terminals, number of sparks until static electricity reaches the display region can be saved even if they are sparked by static electricity in order from an end portion, so that the possibility of static electricity reaching the effective display region can be reduced.

Meanwhile, it is unpreferable to make the area of the dummy pixel electrode larger than ½ the area of the pixel electrode for display because the number of dummy pixels to be parallelly provided cannot be increased unless the non-effective display region is made wider. Further, it is even unpreferable to make the area smaller than 1/20 because a static electricity amount that can be flowed to one dummy pixel electrode becomes smaller. A more preferable area of the dummy pixel electrode is 1/5 or smaller and 1/15 or larger than the area of the pixel electrode for display.

Further, when the source electrodes and the gate electrodes of the switching transistors, which are connected to the dummy pixel electrodes, are parallelly connected to the signal lines and parallelly connected to the scanning lines respectively, many switching transistors that are connected to the dummy pixel electrodes can be arranged in a small area, so that it is possible to make the size of dummy pixel smaller and the non-effective display region (frame portion) does not become wider.

Furthermore, when the channel width and the channel length of the switching transistors connected to the dummy pixel electrodes are made narrower and shorter than the channel width and the channel length of the switching transistors connected to the pixel electrodes for display, the switching transistors connected to the dummy pixel electrodes suffer electrostatic destruction without fail even if static electricity enters from outside because the switching transistors connected to the dummy pixel electrodes suffer electrostatic destruction easier than the switching transistors connected to the pixel electrodes for display, so that there is a less possibility that static electricity will enter the effective display region.

What is claimed is:

1. An active matrix liquid crystal display device, comprising:
   a plurality of signal lines and scanning lines which are arranged in a matrix state on a substrate;
   thin-film transistors (TFTs) arranged near the intersection of each of said signal lines and said scanning lines; and
   pixel electrodes that are severally arranged in positions surrounded by each of said signal lines and said scanning lines and connected to said TFTs, for display that contributes to display, which is provided in an effective display region, and a dummy pixel electrode that does not contribute to display, which is provided in a non-effective display region,
   wherein said dummy pixel electrode has a smaller area than the area of said pixel electrode for display and a plurality of dummy pixel electrodes are in parallel to each other and perpendicularly arranged along each of the signal lines for protecting TFTs connected to said pixel electrodes for display from destruction due to static electricity,
   wherein source electrodes and gate electrodes of TFTs of said dummy pixel electrodes are connected in parallel to said signal lines and connected in parallel to said scanning lines, respectively, and wherein auxiliary capacitance electrodes are provided under drain electrodes of the TFTs of said dummy pixel electrodes.

2. The active matrix liquid crystal display device according to claim 1, wherein the area of said dummy pixel electrode is ½ or smaller than the area of said pixel electrode for display.

3. The active matrix liquid crystal display device according to claim 1, wherein the area of said dummy pixel electrode is not less than 1/20 of the area of said pixel electrode for display.

4. The active matrix liquid crystal display device according to claim 1, wherein the channel width and the channel length of the TFTs of said dummy pixel electrodes are narrower and shorter than the channel width and the channel length of the TFTs connected to said pixel electrodes for display.

* * * * *